(12) United States Patent
Mizutani et al.

(10) Patent No.: US 9,711,052 B2
(45) Date of Patent: Jul. 18, 2017

(54) FLIGHT PATH SEARCH DEVICE AND FLIGHT PATH SEARCH PROGRAM

(71) Applicant: FUJI JUKOGYO KABUSHIKI KAISHA, Tokyo (JP)

(72) Inventors: Takuma Mizutani, Tokyo (JP); Yasuhiko Yanase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/970,258

(22) Filed: Dec. 15, 2015

(65) Prior Publication Data

US 2016/0210865 A1 Jul. 21, 2016

(30) Foreign Application Priority Data

Jan. 16, 2015 (JP) .................................. 2015-006340

(51) Int. Cl.
*G08G 5/00* (2006.01)
*G01C 21/00* (2006.01)

(52) U.S. Cl.
CPC ........... *G08G 5/0034* (2013.01); *G01C 21/00* (2013.01)

(58) Field of Classification Search
USPC ........................................................ 701/528
See application file for complete search history.

(56) References Cited

U.S. PATENT DOCUMENTS

| | | | |
|---|---|---|---|
| 6,963,800 B1 * | 11/2005 | Milbert | .................. F41H 13/00 340/995.21 |
| 7,194,353 B1 | 3/2007 | Baldwin et al. | |
| 2005/0150997 A1 | 7/2005 | Sjanic | |
| 2006/0116814 A1 * | 6/2006 | Milbert | .................. G01C 21/20 701/416 |
| 2011/0029234 A1 | 2/2011 | Desai et al. | |

(Continued)

FOREIGN PATENT DOCUMENTS

| | | |
|---|---|---|
| JP | 6-149376 A | 5/1994 |
| JP | 2812639 B2 | 10/1998 |

(Continued)

OTHER PUBLICATIONS

European Search Report EP Application No. 16150535.9 dated Jun. 14, 2016.

(Continued)

*Primary Examiner* — Jean-Paul Cass

(74) *Attorney, Agent, or Firm* — McDermott Will & Emery LLP

(57) ABSTRACT

In a flight path search device, storage stores map information and enemy force range information. A grid divider divides the map information into cells in grid form. A score calculator calculates, for each cell, a score about an attack avoidance degree. A cell calculator calculates a second cell that is on an extension of a line connecting the enemy forces point and a first cell within the enemy region and is outside the enemy region. A searcher searches for an optimal cell to which to move from the first cell when moving toward the second cell, based on the calculated score. An updater updates the first cell when the optimal cell disagrees with the second cell. The cell of the predetermined point is set as the first cell, and the process is repeated until the optimal cell agrees with the second cell.

2 Claims, 6 Drawing Sheets

(56) References Cited

U.S. PATENT DOCUMENTS

2013/0124089 A1   5/2013  Herman et al.
2014/0180914 A1*  6/2014  Abhyanker .............. G01C 1/00
                                                    705/39

FOREIGN PATENT DOCUMENTS

| JP | 2003-099900 A | 4/2003 |
| JP | 3557444 B2 | 8/2004 |
| JP | 2015-001377 A | 1/2015 |

OTHER PUBLICATIONS

Ferns Paanakker, "Risk-Adverse Pathfinding Using Influence Maps", In: A1 Programming Wisdom 4, Feb. 20, 2008, Charles River Media, pp. 173-178.

* cited by examiner

FLIGHT PATH SEARCH DEVICE AND FLIGHT PATH SEARCH PROGRAM

CROSS-REFERENCE TO RELATED APPLICATIONS

The present application claims priority from Japanese Patent Application No. 2015-006340 filed on Jan. 16, 2015, the entire contents of which are hereby incorporated by reference.

BACKGROUND

1. Technical Field

The present invention relates to a flight path search device and flight path search method to search for a flight path for entry to an enemy region where an attack from enemy forces is conceivable.

2. Related Art

Conventionally, flight paths for aircraft have been set taking into consideration various conditions, such as the flight environment of the aircraft, geographical features along the route, and so forth. Various technologies have been proposed relating to this point (see Japanese Unexamined Patent Application Publication No. 2003-99900, and Japanese Patent Nos. 3557444 and 2812639, for example).

However, the above conventional technology does not assume application to military aircraft, and does not take into consideration safety regarding attacks from enemy forces. Accordingly, the conventional related art does not provide for searching for an optimal flight path for entry to an enemy region where an attack from enemy forces is conceivable such that a target point can be quickly reached while avoiding attacks.

SUMMARY OF THE INVENTION

It is desirable to enable searching for an optimal flight path for entry to an enemy region where an attack from enemy forces is conceivable.

A first aspect of the present invention provides a flight path search device that searches for a flight path of an aircraft, from outside of an enemy region including an enemy forces point to a predetermined point within the enemy region. The flight path search device includes: storage that stores map information of a predetermined range, and enemy force range information; a grid divider that divides the map information stored in the storage, into cells in grid form on a horizontal plane; a score calculator that calculates a score relating to an attack avoidance degree, for each of the cells, based on the map information and enemy force range information stored in the storage; a cell calculator that calculates a second cell that is situated on an extension of a straight line connecting the enemy forces point and a first cell within the enemy region, on the map information, and is situated outside of the enemy region, the extension extending towards the first cell; a searcher that searches for, among adjacent cells adjacent to the first cell on the map information, an optimal cell to which to move from the first cell when moving from the first cell toward the second cell, based on the score calculated by the score calculator; and an updater that updates the first cell by setting the optimal cell as a new first cell, in a case where the optimal cell found by the searcher does not agree with the second cell. The cell where the predetermined point is situated is set as the first point, and the calculating of the second cell by the cell calculator, the searching for the optimal cell by the searcher using the second cell, and the updating of the first cell by the updater, are repeated until the optimal cell found by the searcher agrees with the second cell.

The score calculator may calculate the score for each of the adjacent cells adjacent to the first cell, each time the updater updates the first cell. The searcher may search for the optimal cell based on the scores of each of the adjacent cells calculated by the score calculator.

The score calculator may calculate the score relating to attack avoidance degree of the each of the cells, based on both a score relating to distance between the first cell and the each of the cells, and a score relating to a degree of threat of enemy forces present at the enemy forces point. The score relating to the degree of threat of enemy forces may be calculated based on both a score relating to distance between the enemy forces and the each of the cells, and a score relating to geographical features of the each of the cells from the perspective of avoiding attack.

A second aspect of the present invention provides a flight path search program that searches for a flight path of an aircraft, from outside of an enemy region including an enemy forces point to a predetermined point within the enemy region. The program causes a computer, including storage that stores map information of a predetermined range and enemy force range information, to perform: a grid dividing function of dividing the map information stored in the storage, into a cells in grid form on a horizontal plane; a score calculating function of calculating a score relating to an attack avoidance degree, for each of the cells, based on the map information and enemy force range information stored in the storage; a cell calculating function of calculating a second cell that is situated on an extension of a straight line connecting the enemy forces point and a first cell within the enemy region, on the map information, is situated outside of the enemy region, the extension extending towards the first cell; a searching function of searching for, among adjacent cells adjacent to the first cell on the map information, an optimal cell to which to move from the first cell when moving from the first cell toward the second cell, based on the score calculated by the score calculating function; and an updating function of updating the first cell by setting the optimal cell as a new first cell, in a case where the optimal cell found by the searching function does not agree with the second cell. The cell where the predetermined point is situated is set as the first point, and the calculating of the second cell by the cell calculating function, the searching for the optimal cell by the searching function using the second cell, and the updating of the first cell by the updating function, are repeated until the optimal cell found by the searching function agrees with the second cell.

DETAILED DESCRIPTION

An implementation of the present invention will be described with reference to the drawings.

Configuration

Figure 1:
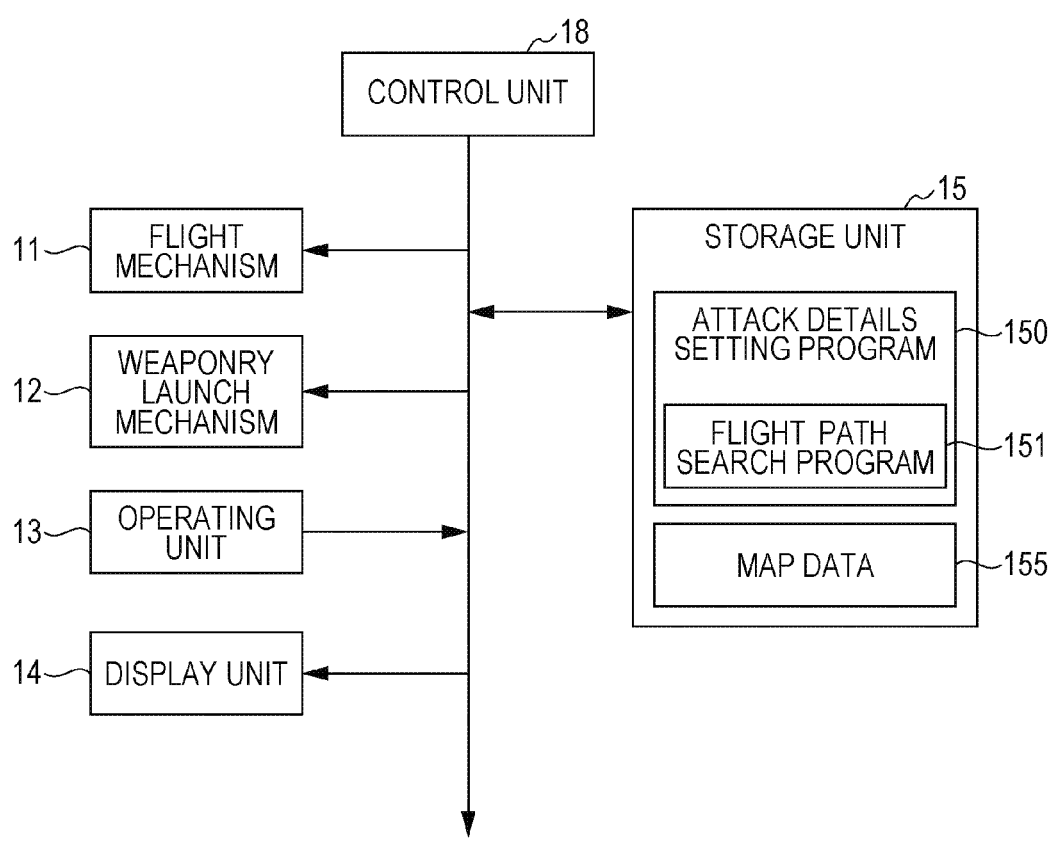
FIG. 1 is a block diagram illustrating a functional configuration of an aircraft according to an implementation.

The configuration of a flight path search device according to the implementation of the present invention will be described with reference to FIG. 1. FIG. 1 is a block diagram illustrating the functional configuration of an aircraft 10 to which the flight path search device according to the implementation of the present invention has been applied.

The aircraft 10 in the implementation is a military rotorcraft (attack helicopter) bearing armament, that carries out missions to start moving from a predetermined mission start point, and attack a target existing at a target point TP within later-described enemy region ADU (see FIG. 3, etc.). More specifically, the aircraft 10 includes a flight mechanism 11, a weaponry launch mechanism 12, an operating unit 13, a display unit 14, a storage unit 15, a control unit 18, and so forth, as illustrated in FIG. 1. The flight mechanism 11 is a mechanism that causes the aircraft 10 to fly, and primarily includes a main rotor that generates lift necessary for the aircraft to fly, and an internal combustion engine (e.g., a jet engine) that generates thrust.

The weaponry launch mechanism 12 is a mechanism to launch rockets, missiles, and so forth, with which the aircraft 10 is armed.

The operating unit 13 includes a control stick, various types of operating keys, and so forth. Signals corresponding to the operation state of these control stick, various types of operating keys, and so forth, are output to the control unit 18. The display unit 14 includes a display that is omitted from illustration, and displays various types of information on the display based on display signals input from the control unit 18.

The storage unit 15 is memory that stores programs and data to realize the various functions of the aircraft 10, and also functions as work area. The storage unit 15 according to the present implementation stores an attack details setting program 150, map data 155, and so forth. The attack details setting program 150 is a program that causes the control unit 18 to execute later-described attack details setting processing (see FIG. 2). The attack details setting program 150 has a flight path search program 151 according to the implementation of the present invention. The flight path search program 151 is a program that causes the control unit 18 to execute later-described flight path search processing (see FIG. 4).

The map data 155 has comprehensive geographical information including, in addition to land features such as mountains, rivers, and so forth, information relating to the state of usage of land, such as roads and railways, buildings, fields, and so forth. The map data 155 may be information of a regional range relating to the mission, i.e., a predetermined range including at least a target point TP within later-described and enemy region ADU (see FIG. 3). The storage unit 15 also stores various types of information necessary for the later-described attack details setting processing, such as coordinates of the mission start point and so forth, information of the range of enemy forces within the enemy region ADU, and so forth.

The control unit 18 centrally controls the parts of the aircraft 10. Specifically, the control unit 18 performs such as controlling the operations of the flight mechanism 11, the weaponry launch mechanism 12, and so forth, loading a specified program from programs stored in the storage unit 15 and executing various processes cooperatively with the loaded program, and so forth, based on pilot operations at the operating unit 13.

Operations

Figure 2:
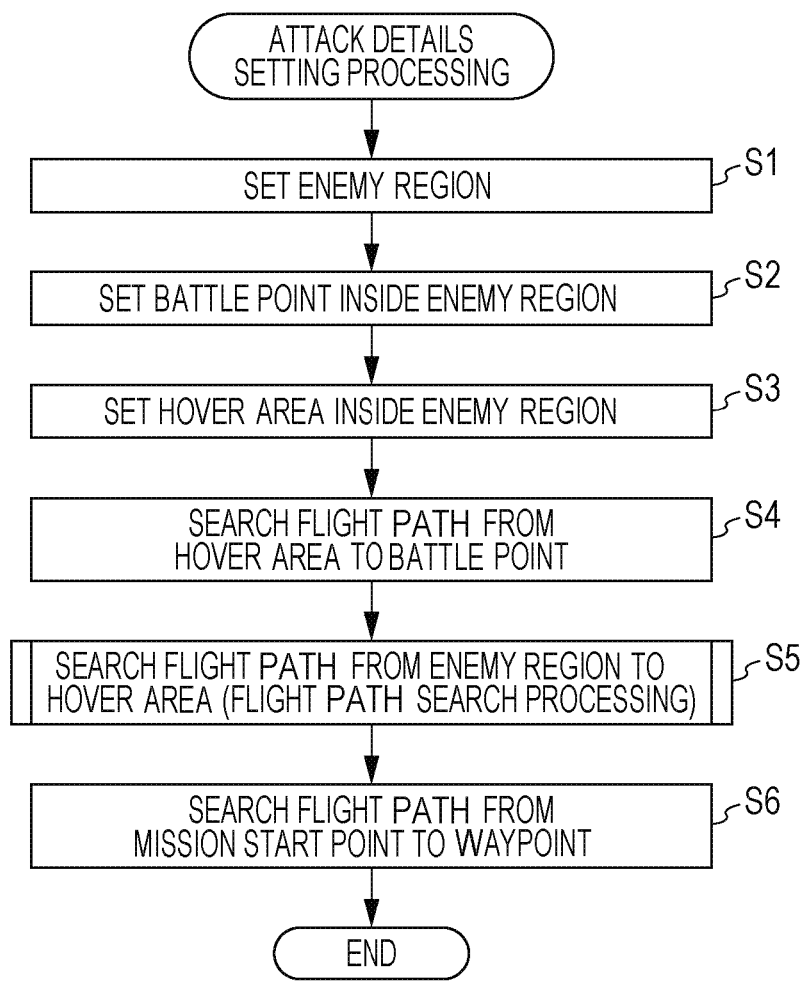
FIG. 2 is a flowchart illustrating the flow of attack details setting processing.
Figure 4:
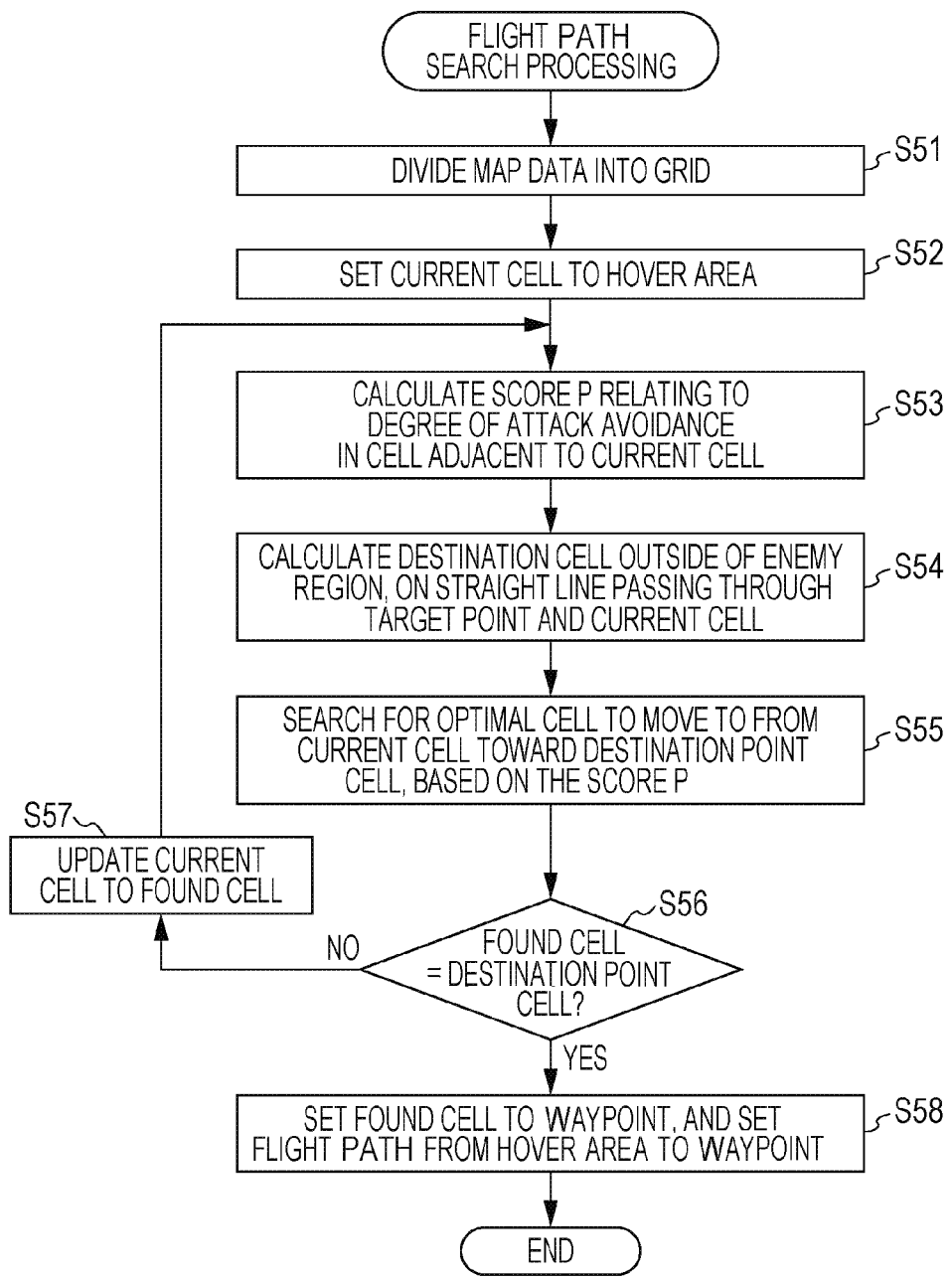
FIG. 4 is a flowchart illustrating the flow of flight path search setting processing.
Figure 5A:
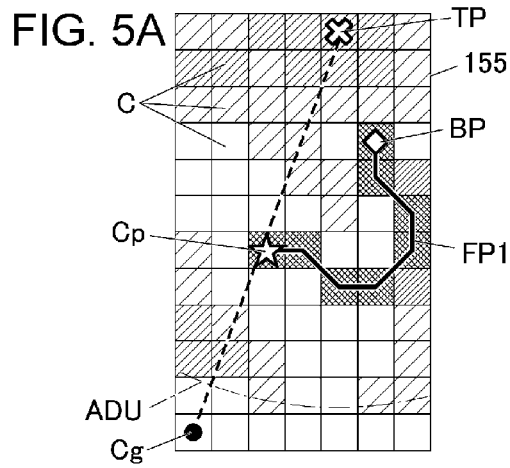
FIGS. 5A through 5F are diagrams for describing flight path search processing.
Figure 5B:
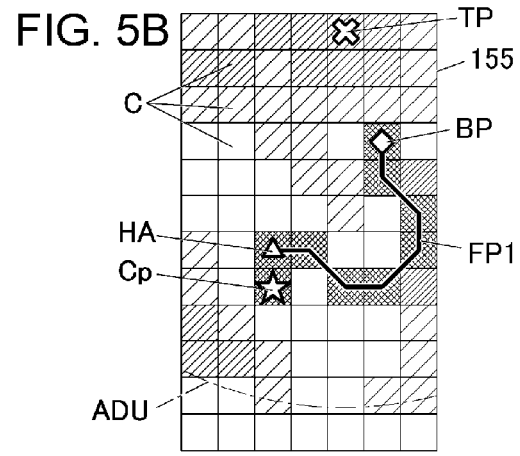
Figure 5C:
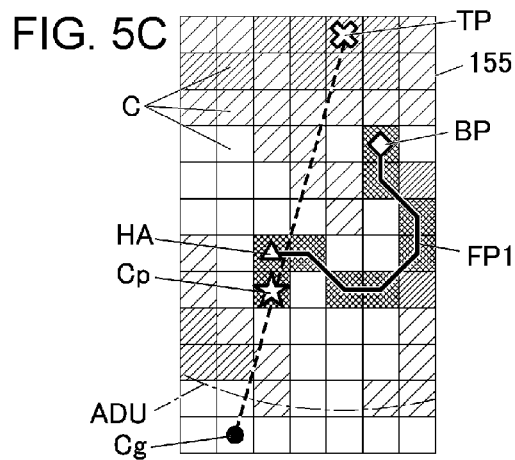
Figure 5D:
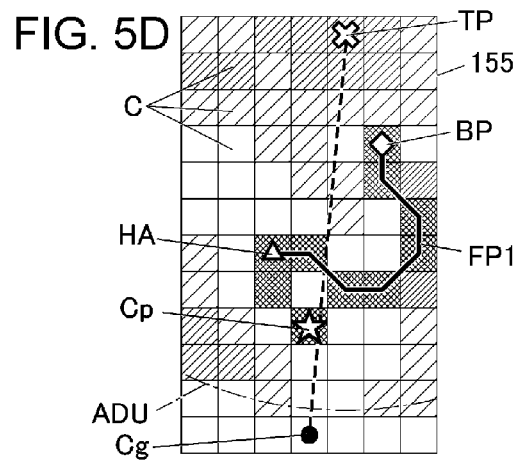
Figure 5E:
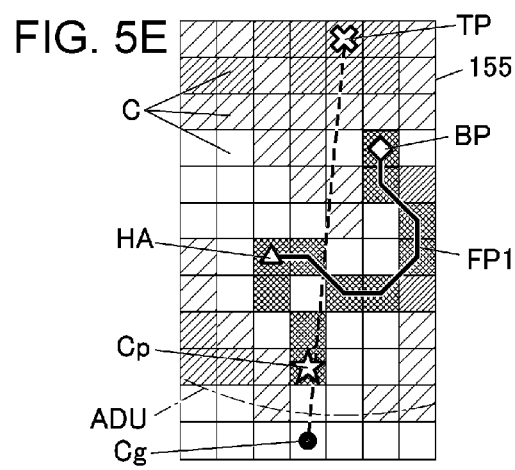
Figure 5F:
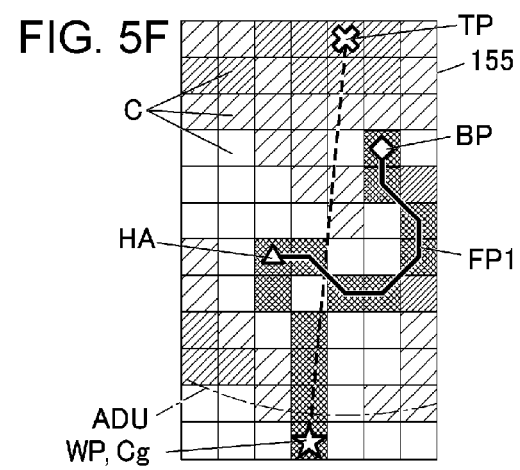
Figure 6:
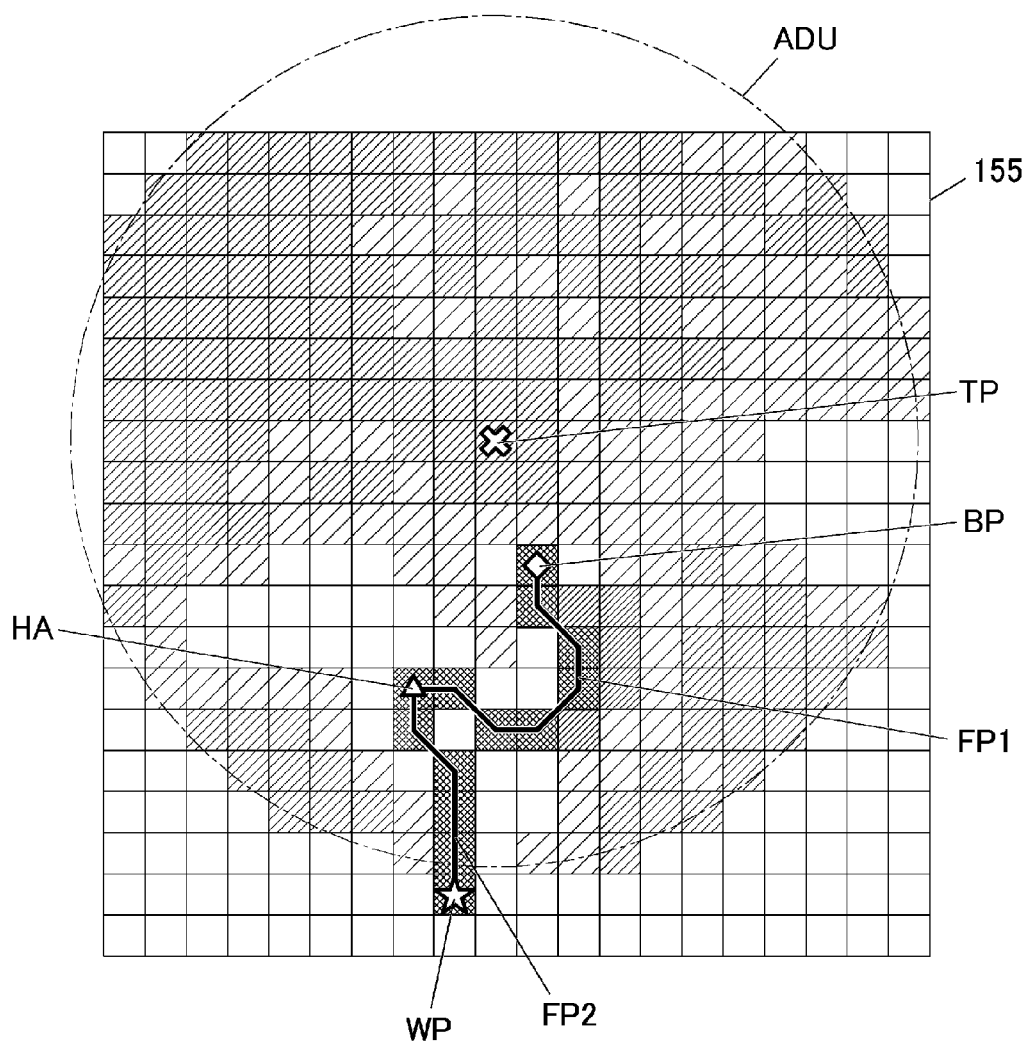
FIG. 6 is a diagram for describing flight path search processing.

Next, operations at the time of the aircraft 10 performing the attack details setting processing will be described with reference to FIGS. 2 through 6. FIG. 2 is a flowchart illustrating the flow of attack details setting processing, and FIG. 3 is a diagram for describing attack details setting processing. FIG. 4 is a flowchart illustrating the flow of flight path search setting processing, and FIGS. 5A through 6 are diagrams for describing flight path search processing.

The attack details setting processing is processing to set an optimal battle point BP for carrying out an attack on a target point TP which is an enemy forces point, and then searching and setting a flight path to this battle point BP. This attack details setting processing is executed by the control unit 18 reading out and loading the attack details setting program 150 from the storage unit 15 upon an execution instruction for the attack details setting processing being input by pilot operations.

Figure 3:
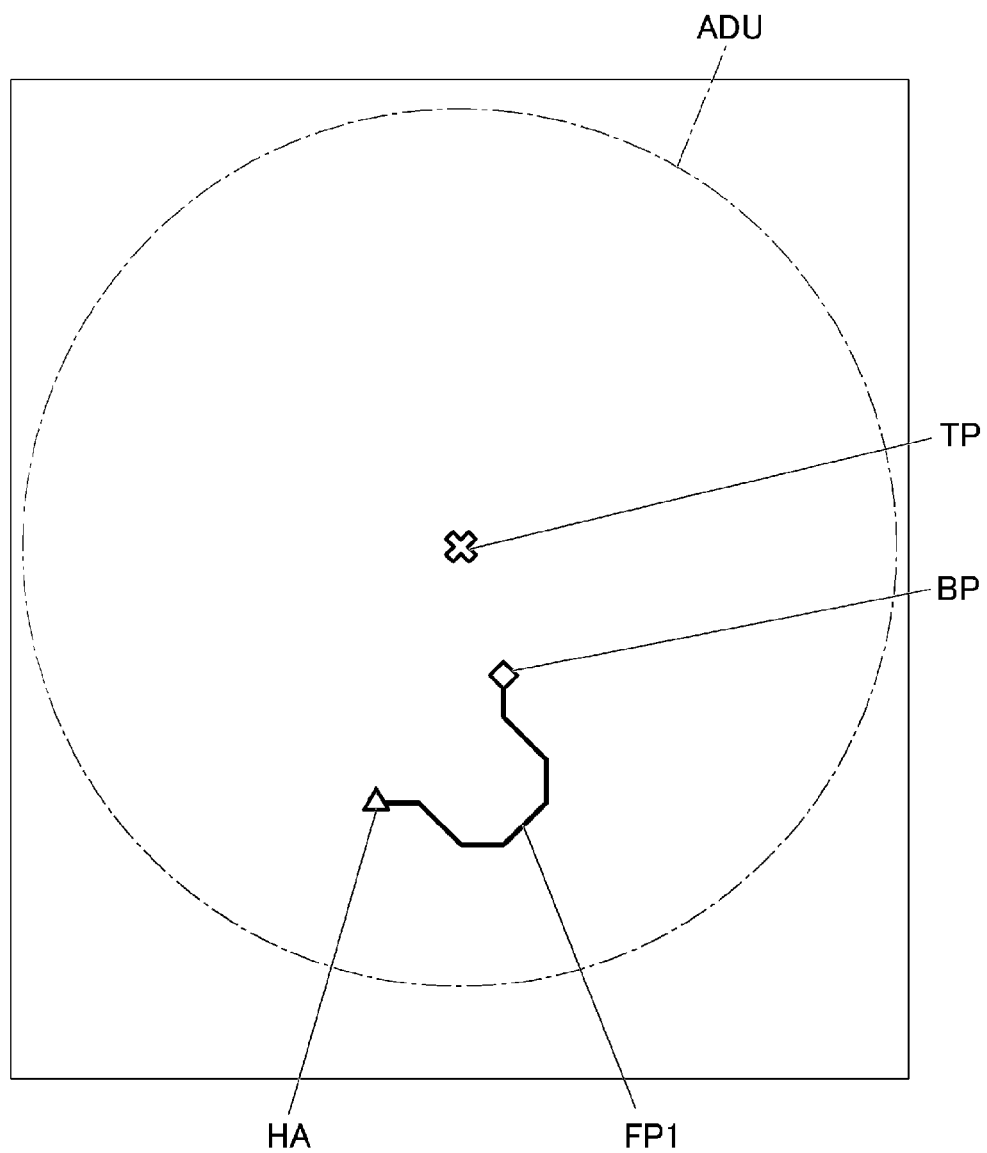
FIG. 3 is a diagram for describing attack details setting processing.

Upon the attack details setting processing being performed, first, as illustrated in FIGS. 2 and 3, the control unit 18 sets an enemy region ADU within a predetermined range including a target point TP (step S1). An enemy region ADU is a geographical range regarding which there is a possibility of being attacked by enemy forces, primarily at the target point TP. The enemy region ADU may be calculated based on enemy force range information and so forth stored in the storage unit 15 or directly input by the pilot, and set. The control unit 18 then stores the set enemy region ADU in the storage unit 15.

Next, the control unit 18 sets a battle point BP within the enemy region ADU, for carrying out an attack on the target point TP (step S2). The battle point BP may be calculated based on map data 155 and enemy force range information and so forth stored in the storage unit 15 or directly input by the pilot, and set. The control unit 18 then stores the coordinates of the battle point BP that has been set in the storage unit 15.

The control unit 18 next sets a hover area HA within the enemy region ADU, from which the battle point BP is visible (step S3). This hover area HA in the present implementation is a point at a distance within a predetermined amount of time from the battle point BP by flying hugging the ground, and from which the battle point BP is visible. This hover area HA may be calculated based on map data 155 and enemy force range information and so forth stored in the storage unit 15 or directly input by the pilot, and set. The control unit 18 then stores the coordinates of the hover area HA that has been set in the storage unit 15.

Next, the control unit 18 searches for a first flight path FP1 from the hover area HA to the battle point BP (step S4). The first flight path FP1 is searched for by predetermined search processing, as a path from the battle point BP to the hover area HA, which is the opposite direction to the actual flight direction. This first flight path FP1 may be searched for in the same way as a second flight path FP2 in step S5, to be described later.

The control unit 18 next executes flight path search processing, to search for a second flight path FP2 from a waypoint WP outside of the enemy region ADU to the hover area HA inside of the enemy region ADU (step S5). The waypoint WP is undetermined at the and the present point, and is searched and set as the same time as the second flight path FP2 in the flight path search processing, as a point outside of the enemy region ADU, from which the enemy region ADU can be safely and quickly entered as far as the hover area HA. This flight path search processing is executed by the control unit 18 reading out and loading the flight path search program 151 from the storage unit 15 upon an execution instruction for the flight path search processing being input by pilot operations.

Upon the flight path search processing being executed, the control unit 18 first reads the map data 155 from the storage unit 15, and divides the map data 155 into a grid form of multiple cells C in a horizontal plane, as illustrated in FIG. 4 (step S51). The control unit 18 generates the multiple cells C as a square grid along the division lines that run north-south and east-west on the map data 155 in the implementation. Each square is 50 meters each way. The shape of the cells does not have to be square, as long as a grid is realized. For example, a rhombic grid, a hexagonal grid (honeycomb), or the like, may be used.

The control unit 18 next initially sets a cell C where the hover area HA exists as a current location cell Cp for the search processing (step S52, FIG. 5A). The current location cell Cp is a tentative current location for the aircraft 10 in the search processing. The current location cell Cp is dynamically changed by the following processing whereby a path from the hover area HA to outside of the enemy region ADU, which is opposite to the actual flight direction, is searched.

Next, the control unit 18 calculates a score P relating to the attack avoidance degree of each of the multiple cells C adjacent to the current location cell Cp, based on the map data 155 and enemy force range information stored in the storage unit 15 (step S53). The score P indicates the likelihood of the aircraft 10 being attacked by enemy forces when flying from the current location cell Cp to this cell C, and the lower the value is, the more readily attack is avoided, i.e., the safer the cell C is. More specifically, the control unit 18 calculates the score of the cell C in step S53 using the following Expression (1)

$$P = P1 \times P2 \qquad \text{Expression (1)}$$

where P1 is a score of flight relating to the distance from the current location cell Cp to the cell C, and is calculated using the following Expression (2)

$$P1 = \{x^2 + y^2 + (z \times P11)^2\}^{1/2} \qquad \text{Expression (2)}$$

where x, y, and z are the distance from the current location cell Cp to the cell C along the axes in an orthogonal coordinates system in which z is the vertical axis. P11 is a score for weighting the distance in the vertical direction in accordance with the direction of movement. A predetermined coefficient corresponding to the distance and so forth thereof, is selected for each of when ascending and when descending.

P2 is a score relating to the degree of threat of the target existing at the target point TP, and is calculated by the following Expression (3)

$$P2 = P21 \times P22 \qquad \text{Expression (3)}$$

where P21 is a score relating to the distance to the target, and P22 is a score relating to geographical features, from the perspective of avoiding attack.

The closer the distance from the target point TP to the cell C is in linear distance, the larger the value set to P21 is. Specifically, P21 is set using a table or relational expression in which this distance and the score P21 have been correlated. P22 is set based on the map data 155 and enemy force range information stored in the storage unit 15.

The geographical feature state of the cell C is selected from the following (1) through (4) in the present implementation. The score of the cell C is set in descending order from (1) to (4).

(1) Exposed to at least one enemy regardless of altitude
(2) Not exposed to any enemy, but cannot gain altitude above 150 feet.
(3) Can gain altitude above 150 feet without being exposed to any enemy, but the enemy sees sky when ascending from exposure height to 100 feet.
(4) Can gain altitude above 150 feet without being exposed to any enemy, and also the enemy does not see sky when ascending from exposure height to 100 feet.

Next, the control unit 18 calculates a destination point cell Cg corresponding to the current location cell Cp at the current point (step S54). Specifically, the control unit 18 calculates the closest cell C which is on a straight line connecting the target point TP and the current location cell Cp on the map data 155, extended to the current location cell Cp side, and which is situated outside of the enemy region ADU (FIG. 5A), as destination point cell Cg.

The control unit 18 then searches for a cell C to move to next from the current location cell Cp, based on the scores P of the multiple cells C relating to the attack avoidance degree calculated in step S53 (step S55). Specifically, the control unit 18 finds, of the multiple cells C adjacent to the current location cell Cp on the map data 155, a cell C optimal to move to from the current location cell Cp when moving from the current location cell Cp to the destination point cell Cg, as the smallest score P on this path of movement. The present implementation uses the A* (pronounced "A-star") search algorithm, which is a representative search algorithm, for this search.

The control unit 18 next determines whether or not the cell C found in step S55 and the destination point cell Cg agree (step S56), and if determined to not agree (No in step S56), the found cell C is updated to the current location cell Cp as a new current location cell Cp (step S57, FIG. 5B), and the flow returns to step S53 described above. That is to say, in this case the processing of steps S53 through S57 is repeated until the current location cell Cp agrees with the destination point cell Cg at that time (FIGS. 5C through 5F). Note that FIGS. 5A through 5F use difference in darkness of hatching to illustrate the magnitude in score at cells C other than cells C adjacent to the current location cell Cp as well, in a simplified manner.

In a case where the control unit 18 determines that the cell C found in step S55 agrees with the destination point cell Cg (Yes in step S56), this found cell C is set as the waypoint WP and the path from the hover area HA to the waypoint WP is set as the second flight path FP2, as illustrated in FIG. 6 (step S58), and the flight path search processing ends.

Next, the control unit 18 executes the attack details setting processing again, and searches for a third flight path FP3 that is omitted from illustration (step S6). The third flight path FP3 is searched for by predetermined search processing, as a path from the mission start point to the waypoint WP, which is the opposite direction to the actual flight direction. This third flight path FP3 may be searched for in the same way as the second flight path FP2 described above in step S5. Thus, a flight path made up of the first flight path FP1, the second flight path FP2, and the third flight path FP3, from the mission start point to the battle point BP within the enemy region ADU, is set.

Advantageous Effects

As described above, according to the present implementation, the map data 155 is first divided into a grid form of multiple cells C in a horizontal plane, and scores P relating to the attack avoidance degree of each of the multiple cells C, based on the map data 155 and enemy force range information. Calculation of a destination point cell Cg which is on a straight line connecting the target point TP within the enemy region ADU and the current location cell Cp and which is situated outside of the enemy region, searching for a cell C optimal to move to from the current location cell Cp when moving from the current location cell Cp to the destination point cell Cg, based on the score P, and updating this cell C to a new current location cell Cp in a case where this optimal cell C does not agree with the destination point cell Cg, are repeated.

That is to say, the current location cell Cp within the enemy region ADU is set as a tentative current location, and the closest point (destination point cell Cg) for linearly moving away from the target point TP to the outside of the enemy region ADU is set as a tentative destination point. This is dynamically changed to successively calculate the destination of movement where the attack avoidance degree is the highest when heading to this closest point, as the new current location cell Cp, up to outside of the enemy region ADU.

Accordingly, by setting the cell C where the hover area HA is situated as the current location cell Cp, the second flight path FP2 heading from outside of the enemy region ADU to the hover area HA inside of the enemy region ADU is searched as a flight path where outside of the enemy region ADU can be safely and speedily reached from the hover area HA, in the opposed direction from the actual flight direction. Accordingly, an optimal flight path can be searched for entry to the enemy region ADU where an attack from enemy forces is conceivable.

Modifications

Note that implementations to which the present invention is applicable are not restricted to the above-described implementation, and that modifications may be made as necessary without departing from the essence of the present invention. For example, while description has been made above that the first current location cell Cp is set as the hover area HA, the initial current location cell Cp is not restricted in particular as long as it is a predetermined point within the enemy region ADU, and if there is no hover area HA, may be set to the battle point BP.

Also, while description has been made that the aircraft 10 carries out an attack on the target point TP within the enemy region ADU, it is sufficient that the aircraft according to the present invention enters an enemy region including an enemy forces point, and may be for reconnaissance alone, or the like, for example.

Also, while an example has been described where the flight path search device according to the present invention is applied to an aircraft 10, the flight path search device according to the present invention is not restricted to this arrangement, and for example may be provided within ground equipment that performs communication with the aircraft 10, or the like.

The invention claimed is:

1. A flight path search device that searches for a flight path of an aircraft, the flight path search device comprising:
a storage that stores in advance map information and enemy force range information of a predetermined range, the map information indicating an enemy region including an enemy forces point; and
a controller configured to implement functions of:
grid divider that divides the map information stored in the storage, into cells in a grid form on a horizontal plane;
a target cell selector that selects a first target cell from the cells, the target cell being situated within the enemy region;
a destination cell calculator that determines a first destination cell that is situated outside of the enemy region and on an extension of a first straight line connecting the enemy forces point and the first target cell within the enemy region, on the map information;
a score calculator calculates an attack avoidance degree score, for each of a first set of adjacent cells being adjacent to the first target cell based on the map information and the enemy force range information stored in the storage;
a searcher that selects, among the first set of adjacent cells, a second target cell based on the attack avoidance degree score, the second target cell being situated along the extension of the first straight line on the map information; and
a flight path identifier that identifies a first flight path that extends from the second target cell to the first target cell as the flight path for the aircraft when a location of the second target cell and a location of the first destination cell match on the map information, wherein
when the location of the second target cell and the location of the first destination cell do not match:
the destination cell calculator determines a second destination cell that is situated outside of the enemy region and on an extension of a second straight line connecting the enemy forces point and the second target cell within the enemy region on the map information,
the score calculator calculates the attack avoidance degree score, for each of a second set of adjacent cells being adjacent to the second target cell based on the map information and the enemy force range information stored in the storage, and
the searcher selects, from among the second set of adjacent cells, a third target cell based on the attack avoidance degree score, the third target cell being situated along the extension of the second straight line, and
when a location of the selected third target cell and a location of the second destination cell match on the map information, the flight path identifier identifies a second flight path that extends through the third target cell, the second target cell, and the first target cell as the flight path for the aircraft,
wherein the controller is further configured to operate a flight mechanism of the aircraft to allow the aircraft to enter an enemy region based on the set flight path of the aircraft.

2. The flight path search device according to claim 1, wherein
the score relating to attack avoidance degree for each of the cells is calculated based on a score relating to distance between the first target cell and each of the first set of adjacent cells, and a score relating to a degree of threat of enemy forces present at the enemy forces point, and
the score relating to the degree of threat of enemy forces is calculated based on a score relating to distance between the enemy forces and each of the first set of adjacent cells, and a score relating to geographical features of each of the first set of adjacent cells from the perspective of avoiding attack.

* * * * *